United States Patent [19]

Best

[11] Patent Number: 4,852,712

[45] Date of Patent: Aug. 1, 1989

[54] CONVEYOR

[75] Inventor: John W. Best, Jonesboro, Ark.

[73] Assignee: Northstar Industries, Inc., Columbus, Ga.

[21] Appl. No.: 99,152

[22] Filed: Sep. 21, 1987

[51] Int. Cl.⁴ .............................................. B65G 13/00
[52] U.S. Cl. ................................. 193/35 TE; 414/373
[58] Field of Search ................. 193/35 R, 35 TE, 37; 414/373, 532–535, 572; 198/581, 588, 594, 632, 782, 812, 861.1, 830; 248/277

[56] References Cited

U.S. PATENT DOCUMENTS

| | | | |
|---|---|---|---|
| 1,841,278 | 1/1932 | Dallas | 248/277 |
| 1,849,205 | 3/1932 | Rypinski. | |
| 2,590,359 | 3/1952 | Zopf | 193/35 TE |
| 2,897,955 | 8/1959 | Morrow | 198/830 |
| 2,988,190 | 6/1961 | Tucker | 193/35 |
| 3,117,662 | 1/1964 | Wahl et al. | 193/37 |
| 3,139,173 | 6/1964 | Greaves | 198/113 |
| 3,258,097 | 6/1966 | Wahl | 193/37 |
| 3,276,558 | 10/1966 | Guske et al. | 193/35 TE |
| 4,266,650 | 5/1981 | Patel et al. | 193/35 TE |
| 4,297,753 | 11/1981 | Langren. | |

FOREIGN PATENT DOCUMENTS

| | | | |
|---|---|---|---|
| 1006797 | 4/1957 | Fed. Rep. of Germany | 193/35 TE |
| 2012700 | 8/1979 | United Kingdom | 198/812 |

Primary Examiner—Joseph E. Valenza
Attorney, Agent, or Firm—Kilpatrick & Cody

[57] ABSTRACT

Flexible and expandable roller conveyors. Conveyors according to the present invention utilize lazy tong structures which are spanned and connected not only by roller axles, but also by braces rigidly connected to corresponding bars in the structures. The resulting conveyors are more economical on a long term basis than previous conveyors because the redundant axle and brace structure allows them to be more durable and resistant to abuse than other conveyors. Lazy tong structures in conveyors of the present invention utilize bars which have flanges on their long edges for additional strength. The flanges thus allow the bars to be formed in longer lengths than bars of earlier lazy tong structures so that fewer moving parts are required and the conveyor is more easily curved and flexed in order to move packages to a variety of desired locations. Conveyors of the present invention are also more easily folded onto connected structures than previous conveyors because of a new flexible and durable hinge structure utilized to connect the conveyors to adjacent surfaces. Flexible and durable leg mounting brackets are also to impart additional strength and durability to the conveyors.

25 Claims, 8 Drawing Sheets

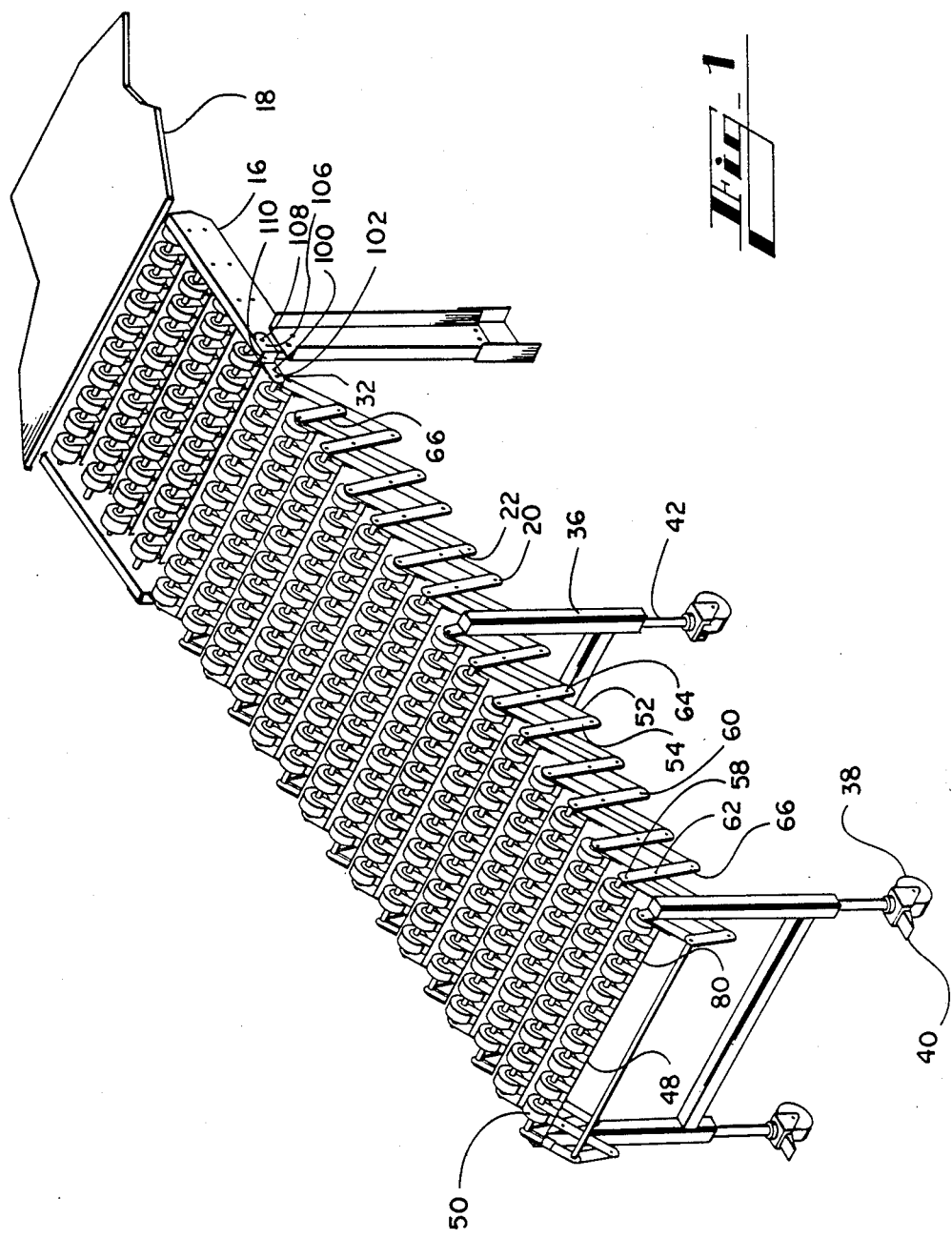

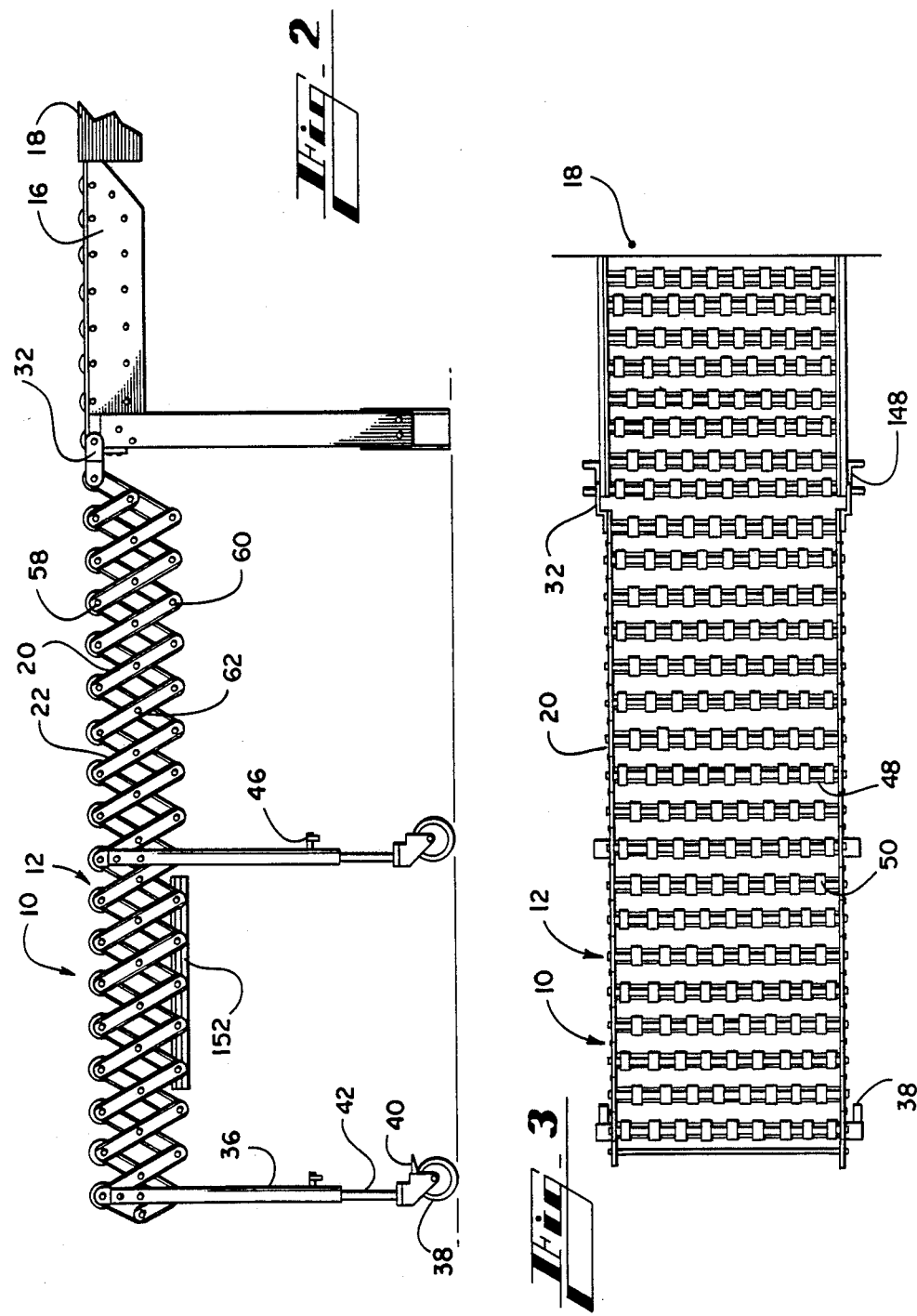

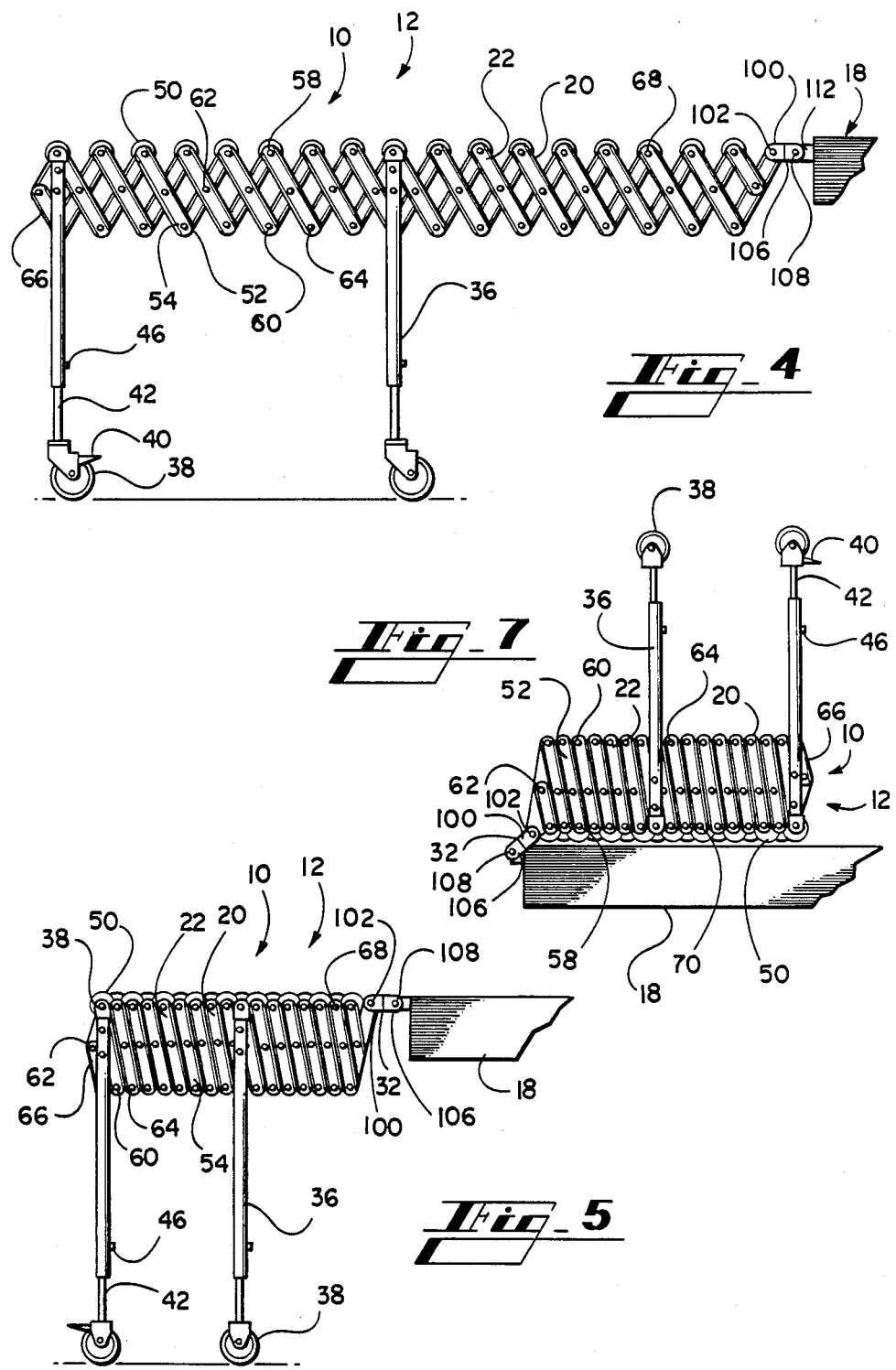

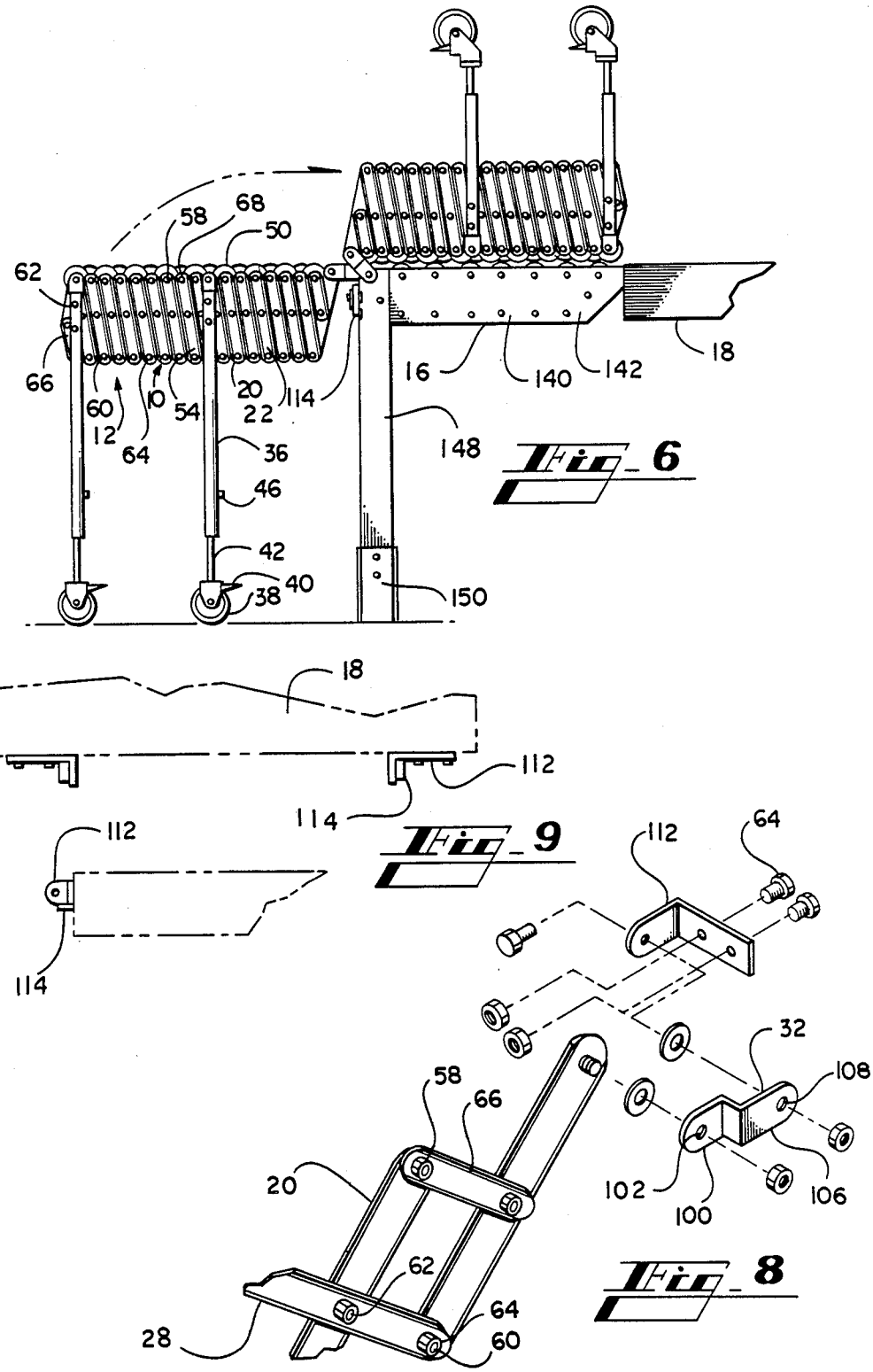

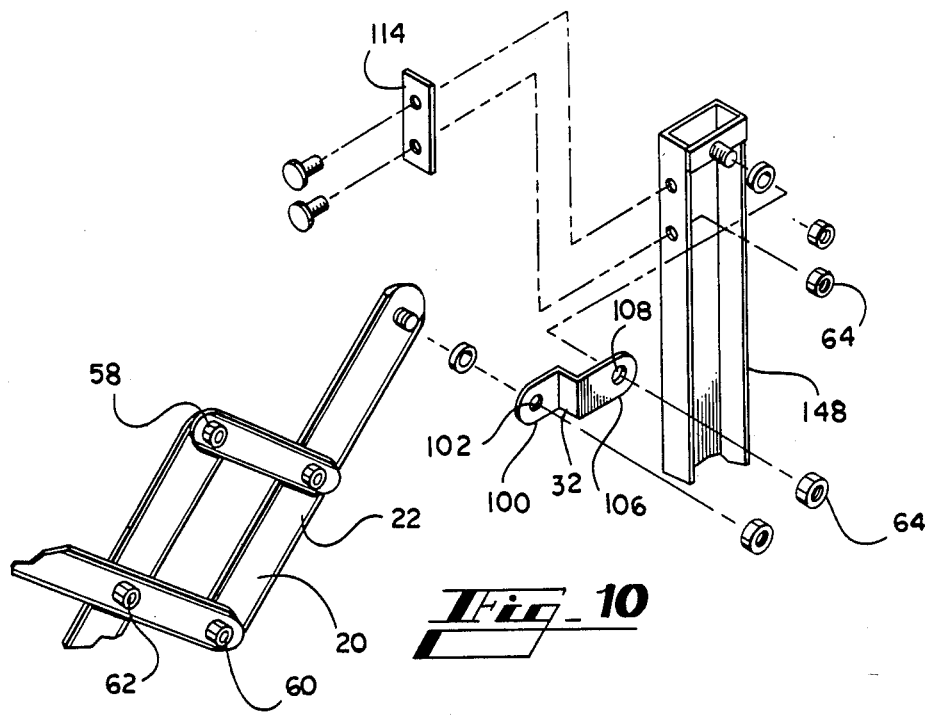
Fig_10
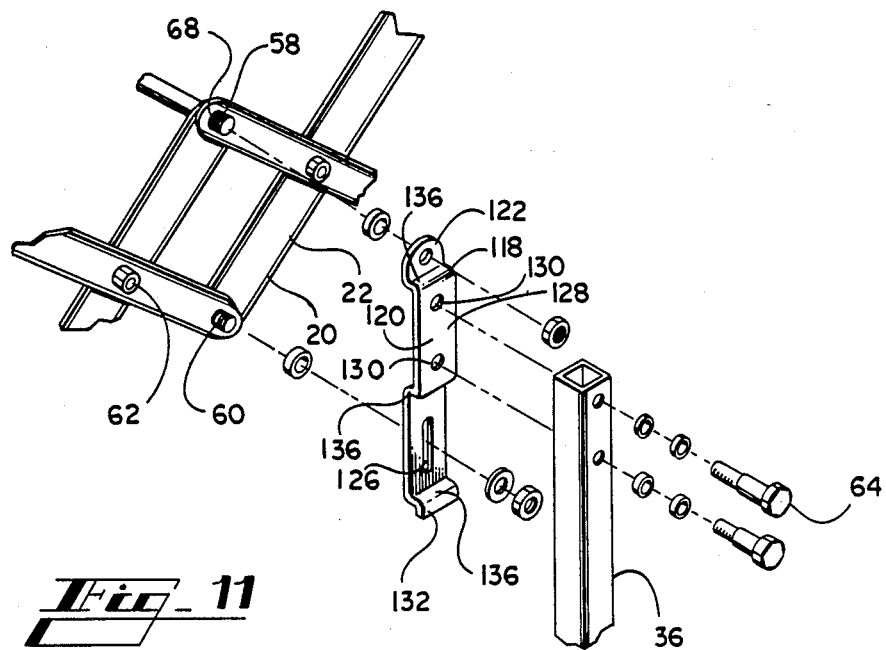
Fig_11

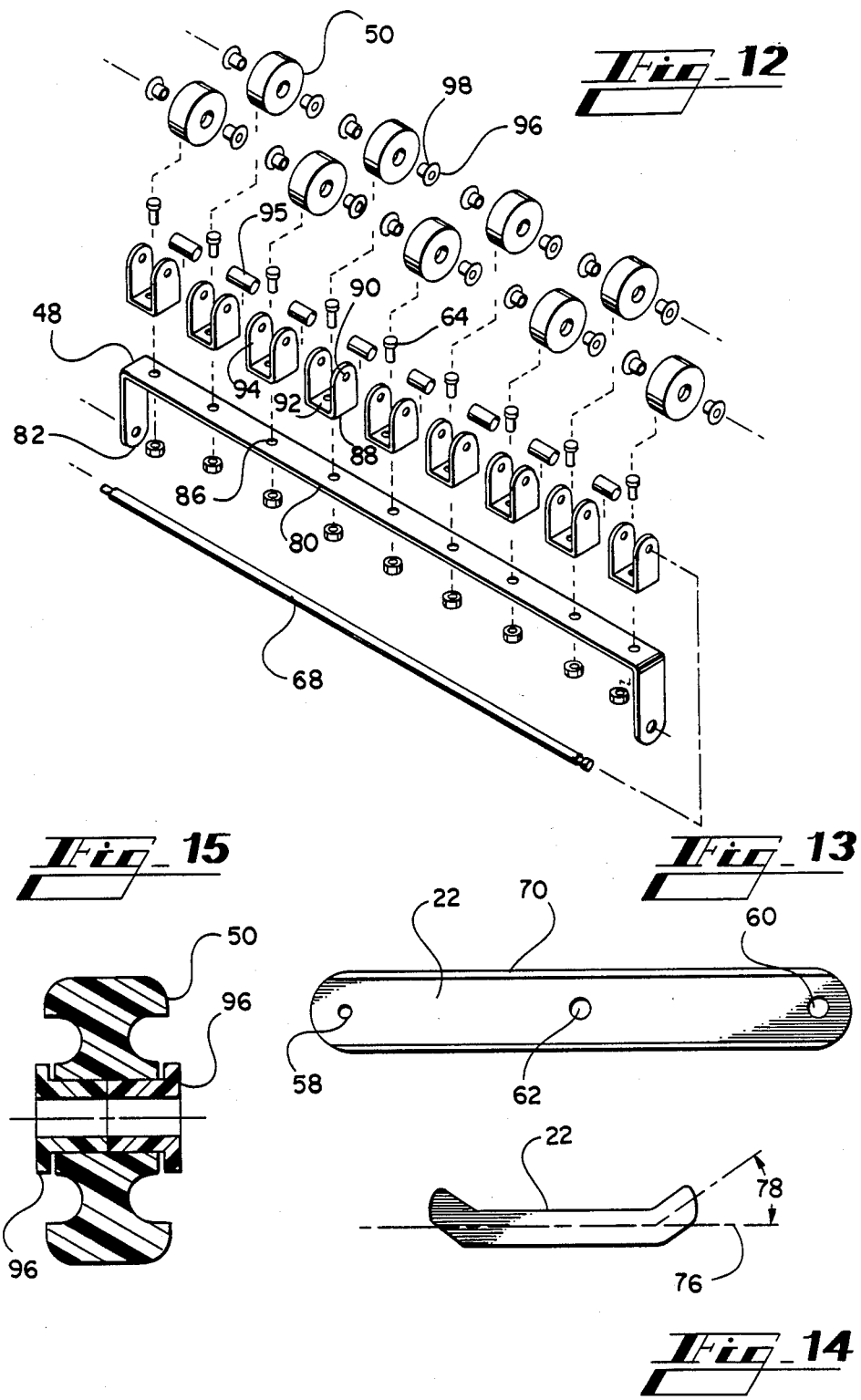

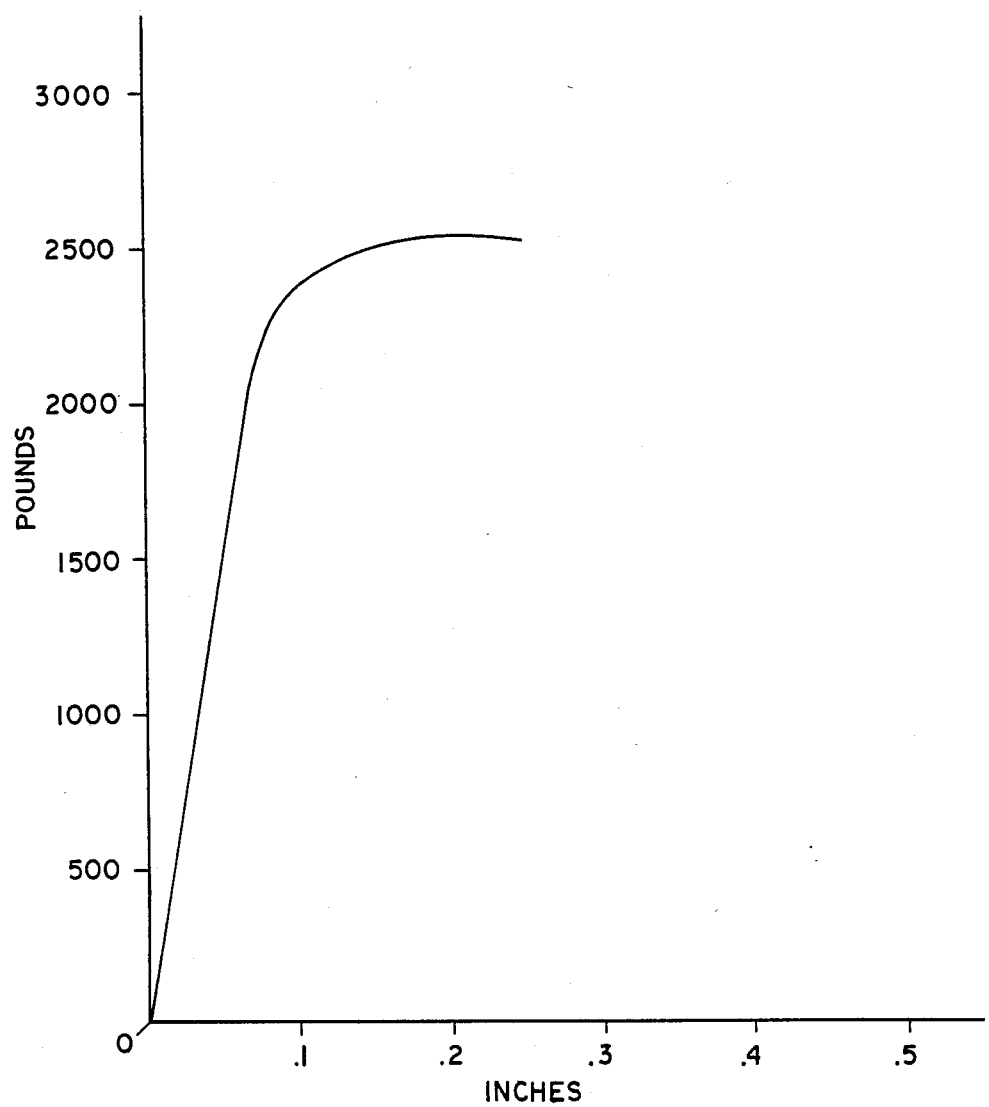
Fig_16

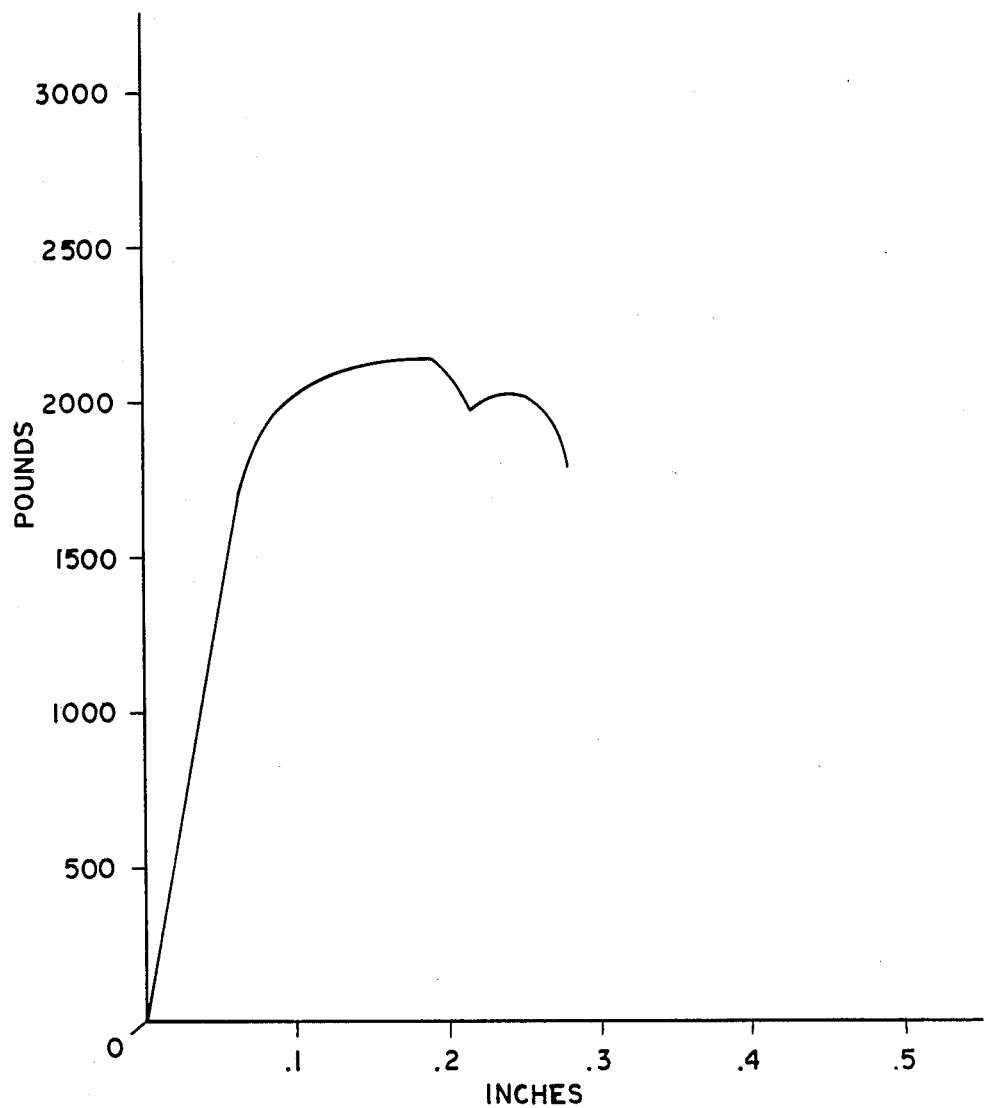
FIG_17

CONVEYOR

This invention relates to flexible and expandable roller conveyors.

BACKGROUND OF THE INVENTION

Flexible expandable roller conveyors which utilize lazy tong support frames or structures have been widely used for many years. Lazy tongs are structures formed of a set of parallel bars, each of which is pivotally connected at its end points and midpoint to other bars in another, transversely oriented, set of parallel bars so that the structure may be extended and retracted with scissors-like action. Such structures for conveyors are disclosed in U.S. Pat. No. 3,276,558 issued Oct. 4, 1966 to Guske, et al. and U.S. Pat. No. 4,266,650 issued May 12, 1981 to Patel, et al., which are incorporated by reference. Those patents disclose conveyors in which two lazy tong structures are spanned and connected by a number of axles or rods, each of which carries several rollers. Such conveyors are sometimes known as "skate-wheel" conveyors because their rollers are similar in construction and appearance to roller skate wheels.

Lazy tong roller conveyors are particularly useful to move packages and other items from one point to other points in a plant or warehouse, and in loading or unloading trucks, airplanes, or containers. They may be flexed and extended or retracted with minimum effort to lead to the desired location, vehicle or container.

Previous lazy tong roller conveyors provide flexibility at the expense of durability, however. The axles or rods connecting the lazy tong structures and carrying the rollers are easily bent as packages or other items are thrown onto the conveyor and create great impacts and high point loads. Such items frequently impact on only one roller and thus easily deform its supporting axle. Packages or items hitting a roller from the roller's side subject the roller and axle to additional bending moments and cause further deformation.

Heavy loads sometimes cause bars in lazy tong structures to bend or buckle so that the bars themselves are an additional failure site in lazy tong roller conveyors. The bars tend to bend or buckle at their midpoints because the cross-section area at those points is reduced by the hole which connects the bar to a corresponding transversely oriented bar. Unexpected loading can cause a number of bars to buckle and the lazy tong structure to become three-dimensional and fail.

An additional source of failure in previous roller conveyors is the rollers themselves. Metal ball bearings and bearings made of other materials can suffer from a short service life when subjected to abuse of the type often encountered by these conveyors.

Previous conveyors reflect an attempt to add strength to lazy tong structures by shortening each bar in the structures. Shorter bars require that the conveyor be less flexible, however, and thus less useful when a curved path for moving packages or items is desired.

SUMMARY OF THE INVENTION

The present invention provides a lazy tong roller conveyor which utilizes not only roller axles but also braces rigidly connected to corresponding bars in the lazy tong structures to span the lazy tong structures and support the rollers. The resulting conveyor proves to be far more economical on a long term basis than earlier conveyors because it is more durable and resistant to abuse than previous such conveyors.

The lazy tong structures in conveyors of the present invention utilize bars which have flanges on their long edges for additional strength. The flanges, which may be oriented from greater than zero degrees to 90° degrees with respect to the flat plane of the bars, increase the strength of the bars primarily by reducing their tendency to buckle under load.

Conveyors of the present invention are also more flexible than earlier conveyors for a surprising reason. Because the flanged bars of the lazy tong structures of the present invention are more rigid, stiffer and stronger than conventional lazy tong bars in previous conveyors, the flanged bars of the present invention may be made longer than previous bars. The play in the connections between the bars in the lazy tong structure, which allows for the structure's lateral flexibility, is thus amplified in conveyors of the present invention by the ratio of the length of such bars to the length of previous bars.

Lazy tong structures of the present invention are structurally less complex than previous such structures for similar reasons; because the bars in the structures are longer than previous bars, fewer bars and fasteners are required to form a conveyor of a given length. Fewer such moving parts reduce the number of potential failure sites.

Conveyors of the present invention may also be more easily folded onto connected structures than previous conveyors because of a new hinge structure of the present invention. The hinge contains one surface with a hole for receiving a fastener in a lazy tong structure and another surface with a hole for receiving a fastener from an adjacent surface or a conveyor extension. A flexion section is oriented at right angles to and connects the surfaces containing the holes. The flexion section allows the hinge to absorb bending moments and twisting forces placed on the conveyor as it is retracted and folded or expanded and unfolded.

It is therefore an object of the present invention to provide a flexible expandable roller conveyor which is stronger, more durable and more flexible than previous roller conveyors.

It is an additional object of the present invention to provide a flexible expandable roller conveyor which includes braces as well as axles to support rollers.

It is an additional object of the present invention to provide a flexible expandable roller conveyor which utilizes lazy tong bars which have flanges located along their long edges for additional strength, stiffness and rigidity.

It is an additional object of the present invention to provide a lazy tong roller conveyor which utilizes fewer lazy tong bars and fasteners than previous such conveyors.

It is an additional object of the present invention to provide a flexible expandable roller conveyor which is more economical to utilize than previous such conveyors.

Other objects, features and advantages of present invention will become apparent with reference to the remainder of the written portion and the drawings of this document.

BRIEF DESCRIPTION OF THE DRAWINGS

FIG. 1 is a perspective view of a conveyor according to the present invention.

FIG. 2 is a side elevational view of the conveyor of FIG. 1 connected to an extension.

FIG. 3 is a top plan view of the conveyor of FIG. 1.

FIG. 4 is a side elevational view of a conveyor according to the present invention connected to an existing conveyor.

FIG. 5 is a side elevational view of the conveyor of FIG. 4 in the retracted position.

FIG. 6 is a side elevational view of the conveyor of FIG. 1 in the retracted position showing how the conveyor may be folded onto its extension.

FIG. 7 is a side elevational view of the conveyor of FIG. 4 folded on the existing conveyor.

FIG. 8 is an exploded perspective view of a hinge assembly for conveyors according to the present invention.

FIG. 9 is a top plan view of a pair of direct mounting brackets according to the present invention.

FIG. 10 is an exploded perspective view of another hinge assembly according to the present invention.

FIG. 11 is an exploded perspective view of a leg bracket according to the present invention.

FIG. 12 is an exploded perspective view of a brace with a set of roller supports, rollers and an axle according to the present invention.

FIG. 13 is a plan view of a preferred embodiment of a lazy tong bar according to the present invention.

FIG. 14 is a cross-sectional view of the bar of FIG. 13.

FIG. 15 is a cross-sectional view of a preferred embodiment of a roller together with a bushing according to the present invention.

FIG. 16 is a curve showing deformation of a flanged bar of the present invention under certain loads.

FIG. 17 is a curve showing deformation of a flat bar, such as used in previous lazy tong structures, under certain loads.

DETAILED DESCRIPTION OF THE DRAWINGS

FIG. 1 is a perspective view of a conveyor 10 according to the present invention. As shown in FIG. 2, conveyor 10 has an expandable section 12 and may have an extension 16 for connecting the conveyor 10 to an existing conveyor or other adjacent surface 18. Alternatively, the conveyor may comprise an expandable section 12 connected directly to an existing conveyor or adjacent surface 18.

Expandable section 12 is formed of two or more lazy tong structures 20. Wider conveyors may include three or more lazy tong structures 20. An expandable section 12 may be connected to an extension 16 or an adjacent surface 18 by use of hinges 32 which connect lazy tong structures 22 to points on the extension 16 or the adjacent surface 18.

The expandable section is preferably, but need not be, supported by legs 36 which may be extendable and may terminate in casters 38. One or more of the casters 38 preferably has a brake 40 to retain conveyor 10 in position. Legs 36 are preferably, but need not be, formed of round or square cross-section tubing and they contain a telescoping section 42 which is secured with a lock pin 46 or other fastener to adjust conveyor 10 to the height at which it will be installed.

Lazy tong structures 20 are spanned and connected with braces 48 which support rollers 50 to form the upper surface of the conveyor 10.

FIGS. 4 and 5 show the expandable section 12 connected to an existing conveyor 18. The lazy tong structures 20 may be retracted as shown in FIG. 5 to allow conveyor 10 to be stored neatly and compactly. As shown in FIGS. 6 and 7, conveyor 10 may also be folded atop extension 16 or existing conveyor or adjacent surface 18 for additional compactness. This feature is particularly useful on loading docks and in plants where floors underneath conveyors 10 must be cleaned or waxed frequently.

Lazy tong structures according to the present invention are formed of a first set 52 of parallel-spaced bars 22, and a transversely oriented, parallel-spaced second set of bars 54. Bars 22 have a first hole 58 located at a first end and a second hole 60 located at their second end. A third, intermediate hole 62 allows bars 22 to be connected intermediate the two end holes. Shorter bars 66 are utilized to terminate either end of lazy tong structure 20. These bars 66 have holes at either end spaced to correspond with the distance between a first hole 58 and intermediate hole 62 or a second hole 60 and intermediate hole 62 on bars 22.

The holes of bars 22 and 66 may be connected with the use of any appropriate fastener 64. In the preferred embodiment, the second hole 60 and third intermediate hole 60 have diameters of 0.375". First holes 58 have a smaller diameter of 0.28125". Second and third holes 60 and 62 are preferably connected with a ⅜" diameter ×'"82 length hex head cap screws and ⅜" low profile nylon lock nuts with a 1" outer diameter ×13/32" inner diameter nylon washer spacer interposed intermediate the bars 22 or 66. First holes 58 are preferably connected with the use of axles 68 which span the lazy tong structures 20 to act as fasteners 64 and also to support rollers 50. All three holes 58, 60 and 62 may have the same diameter, and they may all be penetrated by fasteners 64 rather than relying on axles 68 to connect first holes 58.

Bars 22 and 66 have flanges unlike bars used in previous lazy tong conveyors. As shown more clearly in FIGS. 13 and 14, bars 22 and 66 are generally flat and have flanges 70 extending along their long edges 72. Flanges 70 are oriented at an angle 78 of greater than zero degrees and less than or equal to 90 degrees (less than 91 degrees) with respect to flat plane 76 as shown in FIG. 14. The plane angle 78 is preferably 35° degrees, but a variance of 10 degrees positive or negative with respect to 35° degrees results in minimum significant decrease in strength, stiffness or rigidity of bars 22 and 66. A flange oriented at any angle is better than no flange at all, however, for achieving additional strength, stiffness and rigidity.

Bars 22 and 66 may be formed to be longer than bars of conventional lazy tong conveyors because of the additional stiffness, strength and rigidity from flanges 70. The additional length allows the lazy tong structure to be more flexible. Bars 22 and 66 in the preferred embodiment are 8⅝" long with 7 ⅜" spacing between first hole 58 and second hole 60 centers. The center of third hole 62 is halfway between the center of the other two holes.

Bars 22 and 66 formed of extruded aluminum with flanges 70 formed during the extrusion process have proved remarkably well suited for lazy tong structures 20. The crystalline structure of bars 22 and 66 is thus not adversely effected by bending of the bars to form flanges 70 after the bars have been formed. Iron, steel or other appropriate material may also be used to form bars 22 and 66, however, and flanges 70 may be formed by bending after the bars are formed.

FIG. 16 and 17 are stress deformation diagrams which represent actual tests conducted on a bar 22 according to the present invention in FIG. 16, and on a bar with no flanges in FIG. 17. These diagrams show that a bar according to the present invention has a proportional limit of approximately 2100 pounds while a bar with no flanges as shown in FIG. 17 has a proportional limit of approximately 1800 pounds. The bar of the present invention shown in FIG. 16 has a yield point of approximately 2500 pounds while the bar with no flanges as shown in FIG. 17 has a yield point of approximately 2100 pounds.

Conveyors 10 of the present invention utilize braces 48 as well as axles 68 to support rollers 50. Although this arrangement would appear to elevate the cost of conveyors 10 unnecessarily, the structure adds durability and strength to conveyors 10 so that they last longer and are thus more economical on a long term basis than previous conveyors. A brace 48 is preferably formed of brace member 80 having a "L" shaped cross-section to which are welded two end pieces 82. End pieces 82 contain brace holes 86 which receive fasteners 64 that penetrate third intermediate holes 62 of bars 22 and corresponding holes of bars 66. End pieces 82 are sufficiently long to allow the top surface of brace member 80 to support rollers 50 so that axle 68 extends through first holes 58 in bars 22 and 66. I-beam, C-channel, members having T-shaped cross section, square tubing, round tubing or other appropriate members may be utilized for brace member 80 and may be formed of any desired material. End pieces 82 may likewise be formed of any desired material and connected to brace member 80 as appropriate.

Each brace member 80 bears a plurality of roller supports 88 which receive axle 68 and rollers 50. Roller supports 88 in the preferred embodiment are clips formed of stamped metal to have a base section 92 connecting and oriented at right angles to two side sections 94. The side sections 94 contain axle holes 90 through which an axle 68 passes. Base section 92 on support 88 also contains a hole for attaching the support 88 to the brace member 80 of base 48. In the preferred embodiment supports 88 are fastened to braces 48 with a ¼" diameter ×⅜" length hex head cap screw with a ¼" nylon lock nut. Other fasteners such as other types of screws and nuts or rivets may also be used.

An axle 68 not only serves to connect first holes 58 of two bars 22 or 66 on the lazy tong structures 20 which it penetrates, but it also supports rollers 50. In the preferred embodiment, a bushing 96 is interposed between the roller 50 and its axle 68. Bushing 96 may be formed of two bushing halves 98 inserted into the sides of roller 50. Bushing 96 is preferably formed of delrin, but it may be formed of other polymeric or metallic material as desired depending upon the structure and composition of rollers 50 and axle 68. Rollers 58 in the preferred embodiment are made of a polyolefin material for increased strength and durability. FIG. 15 shows a cross-sectional view of a bushing 96 within a roller 50 of the present invention. Spacers 95 are placed on axles 68 between roller supports 88 to maintain roller supports 88 at predetermined distances between one another.

The redundant support structure provided by brace 48 and axle 68 in supporting rollers 50 allows conveyor 10 to be stronger and more durable than previous conveyors. In particular, rollers 50 can absorb high impacts, high loads and high transverse forces with minimum bending of axle 68 because of the restraint provided by roller supports 88 and spacers 95 and, indirectly, by brace 48 which supports roller supports 88 and retains them rigidly in place.

Hinges 32 allow additional flexibility in conveyors 10 of the present invention. Hinges 32 may connect expandable section 12 of conveyor 10 to an extension 16 or an adjacent surface 18. A hinge 32 includes a first mounting surface 100, which includes a mounting hole 102, a second mounting surface 106 oriented substantially parallel to first mounting surface 100 and containing a second mounting hole 108 and a flexion section 110 connecting first and second mounting surfaces 100 and 106 and oriented substantially normal to them. First mounting hole 102 is connected to a fastener 64 or axle 68 on a lazy tong structure 20. Second mounting hole 108 is connected to a fastener 64 on extension 16 or adjacent surface 18. As shown in FIGS. 8 and 9, second hole 108 may be connected to a direct mounting bracket 112 which is connected to the adjacent surface 18. In the preferred embodiment, a 1" outer diameter ×13/32" inner-diameter nylon washer is interposed between the second mounting surface 106 and the direct mounting bracket 112, and between first mounting surface 100 and lazy tong structure 20. Hinge stops 114 comprising a protrusion extending from direct mounting brackets 112 prevent hinges 32 from rotating beyond a predetermined angle, preferably horizontal, so that hinges 32 maintain the surface of conveyor 10 at the desired angle and height.

FIG. 10 shows a hinge 32 used to connect a lazy tong structure 20 and extension 16. Once again, 1" outer diameter ×13/32" inner diameter nylon washers are preferably interposed between first mounting surface 100 of hinge 32 and lazy tong structure 20 and second mounting surface 106 and extension 16, respectively. Fasteners 64 preferably take the form of a ¼"×⅝" hex head cap screws with ¼" nylon lock nuts extending through first hole 58 of bar 22 of lazy tong structure 20 and first mounting hole 102 of hinge 32, and a ⅜"×¾" length carriage bolt with ⅜" low profile nylon lock nut penetrating second mounting hole 108 of second mounting surface 106 and securing hinge 32 to extension 16. A hinge stop 114 is also utilized to limit rotation of hinge 32 about second mounting hole 108. Hinge stop 114 in the preferred embodiment is a rectangular plate secured to extension 16 by 2⅜"×¾" hex head cap screws secured with ⅜" low profile nylon lock nuts as fasteners 64.

FIG. 11 shows a leg mounting bracket 118 preferably utilized according to the present invention. Leg mounting bracket 118 in the preferred embodiment is a generally "S" shaped metallic plate comprising a first surface 120 for receiving a fastener 64, preferably axle 68 extending through first hole 58 of lazy tong structure 20 to which the bracket 118 is connected. A second mounting surface 122, which is preferably coplanar with first mounting surface 120, contains slot 126 for slidably receiving fastener 64 extending through a second hole 60 of bars 22 or 66 of lazy tong structure 20. A third mounting surface 128, lying in another plane coplanar to the plane containing first and second mounting surfaces 120 and 122, and located between those surfaces, contains mounting holes 130 for receiving fasteners 64 which extend through leg 36 in order to connect leg 36 to leg mounting bracket 118. A fourth stop surface 132 lies generally coplanar with the third mounting surface 128 and below second mounting surface 122 and slot 126 to maintain second mounting surface 122 at a desired distance from leg 36. First mounting surface 120 and second mounting surface 122, which receive fasteners 64 from lazy tong structure 20, are separated by third mounting surface 128 which receives fasteners 64 from leg 36. Third mounting surface 128 is connected to first and second mounting surfaces 120 and 122 by leg mounting bracket 18 flexion sections 136 which are oriented generally perpendicularly to those surfaces to allow bracket 118 to be flexible. Leg mounting brackets 118 are preferably formed of stamped metal, but they may be formed of any desirable material and by any desirable method. Use of leg mounting brackets 118 alleviates the necessity to place a slot 126 in leg 36 and thus weaken the structure of the leg 36. The bracket 118 also allows the connection between leg 36 and lazy tong structure 20 to be more flexible, more durable and more resistant to abuse than earlier leg to lazy tong structure connections. Any desirable fasteners can be utilized to connect leg mounting bracket 118 to leg 36; in the preferred embodiment, $\frac{3}{8}''$ diameter $\times 2''$ length hex head screws are utilized with $\frac{3}{8}''$ low profile nylon lock nuts. Flat washers are preferably interposed between leg 36 and bracket 118. Leg mounting bracket 118 is secured to fastener 64 extending through second holes 60 of bar 22 and 66 of lazy tong structure 20 by a $\frac{3}{8}'' \times 1\frac{1}{4}''$ hex head cap screw with $\frac{3}{8}''$ low profile nylon lock nut. A 1'' outer diameter $\times 13/32''$ inner diameter nylon spacer is preferably interposed between bracket 118 and leg 36. A 1'' outer diameter $\times 13/32''$ inner diameter nylon washer is preferably interposed between bracket 118 and the nylon lock nut. First mounting surface 120 is secured to lazy tong structure 20 with a C-clip cooperating with a score in axle 68 or a $\frac{1}{4}''$ nylon lock nut cooperating with threads on the end of axle 68, or by any other desirable means. A 1'' outer diameter $\times 13/32''$ nylon spacer is preferably interposed between leg mounting bracket 118 and lazy tong structure 20.

Extension 16 can be utilized to connect lazy tong structures 20 to an adjacent surface or existing conveyor 18. It provides an excellent surface on which expandable section 12 of conveyor 10 can be folded with the use of hinges 32. Extension 16 includes two (or more) side pieces 140 spaced apart approximately the width of the lazy tong structures 20 in the expandable section 12. Side pieces 140 each comprise a left half 142 and a right half 146 held together with fasteners 64, in the preferred embodiment. $\frac{1}{4}''$ diameter $\times \frac{3}{4}''$ length hex head cap screws with $\frac{1}{4}''$ flat washers and $\frac{1}{4}''$ nylon lock nuts are preferred. Extension 16 can utilize braces 48 and roller supports 88 with cooperating components mentioned above together with axles 68 which extend through side pieces 140 to be held in place with C-clips 138 or lock nuts. Extension legs 148 may be fastened to extension 16 for support. Adjustable lower extension legs 150 may be adjustably fastened to the lower portions of legs 148 to allow the extension 16 to be adjusted to a suitable height to cooperate with existing conveyor or adjacent surface 18 and expandable section 12. In the preferred embodiment, legs 148 and lower extension legs 150 comprise metal channels. Extension 16 may be bolted or otherwise fastened to existing conveyor or adjacent structure 18, and it is connected to lazy tong structures 20 of expandable section 12 by hinges 32 and described above.

Rigidifying bars or members 152 may be connected to a lazy tong structure 22 to impart additional strength to the structure. A rigidifying member 152 of the preferred embodiment is a channel with a C-shaped cross-section which may be slid onto heads 154 of specially shaped fasteners 64 placed through second holes 60 or third intermediate holes 62 of lazy tong structures 20. Such a rigidifying member 152 is shown in FIG. 4 adding lateral strength to the lazy tong structure 20 and thus conveyor 10 shown in that drawing.

The foregoing is provided for purposes of illustration, explanation and description of a preferred embodiment of the invention. Modifications and adaptations to this embodiment will be apparent to those of ordinary skill in the art and they may be made without departing from the scope or spirit of the invention.

I claim:

1. A conveyor comprising:
   (a) a plurality of lazy tong structures each comprising a plurality of bars connected to each other;
   (b) a plurality of roller support braces, each spanning two lazy tong structures and connected to two corresponding bars in the lazy tong structures and, for each brace:
      (i) a plurality of roller supports connected to the brace;
      (ii) an axle extending through the roller supports on the brace and connecting two bars in each lazy tong structure; and
      (iii) a skate-wheel conveyor roller rotatably mounted on each roller support and supported by the roller support and the axle.

2. A conveyor according to claim 1 in which each bar of the lazy tong structure is formed of extruded aluminum.

3. A conveyor according to claim 1 in which each bar of the lazy tong structure is substantially flat and includes a flange located along each long edge of the bar and oriented at an angle greater than zero degrees and less than ninety-one degrees with respect to the flat plane of the bar.

4. A conveyor according to claim 1 in which each bar of the lazy tong structure is substantially flat and includes a flange located along each long edge of the bar and oriented at an angle of approximately 35 degrees with respect to the flat plane of the bar.

5. A conveyor according to claim 1 further comprising:
   (a) a plurality of legs; and
   (b) a leg mounting bracket connected to each leg, which bracket contains a hole for rotatable connection to a first fastener on a lazy tong structure and a slot for slideable connection to a second fastener on the lazy tong structure.

6. A conveyor according to claim 1 in which a bushing is interposed between each roller and its axle.

7. A conveyor according to claim 6 in which the bushing is formed of delrin and the roller is formed of polyolefin material.

8. A conveyor according to claim 1 further comprising a plurality of hinges, each for connecting a lazy tong structure to an adjacent surface and each comprising:
   (a) a first mounting surface with a hole for rotatable connection to a fastener on a lazy tong structure;
   (b) a second mounting surface with a hole for rotatable connection to the adjacent surface; and
   (c) a flexion section connecting the first and second mounting surfaces and oriented substantially normal to them.

9. A conveyor according to claim 1 further comprising a rigidifying means for capturing portions of a plurality of fasteners on a lazy tong structure in order to increase the strength of the structure.

10. A conveyor according to claim 9 in which the rigidifying means is a channel for capturing a plurality of fasteners which are located substantially collinearly on a lazy tong structure.

11. A conveyor comprising:
(a) a pair of lazy tong structure, each comprising a plurality of bars connected together, each of which bars is substantially flat and includes a flange located along each long edge of the bar and oriented at an angle of approximately 35 degrees with respect to the flat plane of the bar;
(b) a plurality of roller support braces, each spanning two lazy tong structures and connected to two corresponding bars in the lazy tong structures and, for each brace:
  (i) a plurality of roller supports connected to the brace;
  (ii) an axle extending through the roller supports on the brace and connecting two bars in each lazy tong structure; and
  (iii) a skate-wheel conveyor roller rotatably mounted on each roller support and supported by the roller support and the axle; and
(c) a plurality of legs, each of which is pivotally connected to a first fastener on a lazy tong structure and slideably connected to a second fastener on the lazy tong structure.

12. A conveyor comprising:
I. an expandable section, comprising:
(a) a plurality of lazy tong structures, each comprising a plurality of bars connected together;
(b) a plurality of roller support braces, each spanning two lazy tong structures and connected to two connecting bars in the lazy tong structures and, for each brace:
  (i) a plurality of rollers supports connected to the brace;
  (ii) an axle extending through the roller supports on the brace and connecting two bars in each lazy tong structure; and
  (iii) a skate-wheel conveyor roller rotatably mounted on each roller support on the axle;
(c) a plurality of legs, each of which is pivotally connected to a first fastener on a lazy tong structure and slideably connected to a second fastener on the lazy tong structure;
II. an extension for supporting the expandable section when the expandable section is folded and stored on top of the extension; and
III. a plurality of hinges, each for connecting a lazy tong structure to the extension, and each comprising:
(a) a first mounting surface with a hole for rotatable connection to a fastener on a lazy tong structure;
(b) a second mounting surface with a hole for rotatable connection to the extension; and
(c) a flexion section connecting the first and second mounting surfaces and oriented substantially normal to them.

13. A conveyor according to claim 12 in which each bar of the lazy tong structure is formed of extruded aluminum.

14. A conveyor according to claim 12 in which each bar of the lazy tong structures is substantially flat and includes a flange located along each long edge of the bar and oriented at an angle greater than zero degrees and less than ninety-one degrees with respect to the flat plane of the bar.

15. A conveyor according to claim 12 in which each bar of the lazy tong structure is substantially flat and includes a flange located along each long edge of the bar and oriented at an angle of approximately 35 degrees with respect to the flat plane of the bar.

16. A conveyor according to claim 12 in which each of the legs is connected to a lazy tong structure by a mounting bracket connected to the leg, which bracket contains a hole for rotatable connection to a first fastener on the lazy tong structure and a slot for slideable connection to a second fastener on the lazy tong structure.

17. A conveyor according to claim 12 in which a bushing is interposed between each roller and its axle.

18. A conveyor according to claim 17 in which the bushing is formed of delrin material and the roller is formed of polyolefin material.

19. A conveyor according to claim 12 further comprising a rigidifying means for capturing a plurality of fasteners on a lazy tong structure in order to increase the strength of the structure.

20. A conveyor according to claim 19 in which the rigidifying means is a channel for capturing portions of plurality of fasteners which are located substantially collinearly on a lazy tong structure.

21. A conveyor according to claim 1 in which the bars of the lazy tong structure comprise:
(a) a first set of bars having a first end and a first hole located at the first end and a second end and a second hole located at the second end; and
(b) a second set of bars having a first end and a first hole located at the first end and a second end and a second hole located at the second end, and at least one intermediate hole located between the first and second holes.

22. A conveyor according to claim 21 in which the intermediate holes receive fasteners that connect the second bars to roller support braces.

23. A conveyor according to claim 21 in which the second holes receive fasteners that connect the first bars to roller support braces.

24. A conveyor according to claim 21 in which each axle connects the first holes of corresponding bars of the first and second sets of bars.

25. A conveyor according to claim 1 in which the roller supports have "U" shaped cross-sections.

* * * * *